(12) United States Patent
Soyyigit

(10) Patent No.: US 10,808,956 B2
(45) Date of Patent: Oct. 20, 2020

(54) SMART VENTILATION SYSTEM

(71) Applicant: REMA YAPI VE MIMARLIK ANONIM SIRKETI, Istanbul (TR)

(72) Inventor: Suat Soyyigit, Istanbul (TR)

(73) Assignee: REMA YAPI VE MIMARLIK ANONIM SIRKETI, Istanbul (TR)

( * ) Notice: Subject to any disclaimer, the term of this patent is extended or adjusted under 35 U.S.C. 154(b) by 155 days.

(21) Appl. No.: 16/156,188

(22) Filed: Oct. 10, 2018

(65) Prior Publication Data

US 2019/0277522 A1    Sep. 12, 2019

(30) Foreign Application Priority Data

Mar. 9, 2018   (TR) ............................... a 2018 03401
Aug. 14, 2018  (TR) ............................... a 2018 11835

(51) Int. Cl.
| | |
|---|---|
| *F24F 11/00* | (2018.01) |
| *F24F 11/58* | (2018.01) |
| *F24F 11/52* | (2018.01) |
| *F24F 1/031* | (2019.01) |
| *F24F 7/013* | (2006.01) |

(52) U.S. Cl.
CPC .......... *F24F 11/0001* (2013.01); *F24F 1/031* (2019.02); *F24F 7/013* (2013.01); *F24F 11/0008* (2013.01); *F24F 11/52* (2018.01); *F24F 11/58* (2018.01); *F24F 2011/0002* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,326,957 | A * | 8/1943 | Maguire ................. | F24F 7/007 454/343 |
| 2,519,086 | A * | 8/1950 | Eberhart ................. | F24F 1/027 454/204 |
| 2,822,745 | A * | 2/1958 | Frank ....................... | F24F 1/04 454/203 |
| 4,004,432 | A * | 1/1977 | Kong ....................... | F24F 5/00 62/262 |
| 2010/0267326 | A1* | 10/2010 | Back ....................... | F24F 13/18 454/212 |
| 2011/0040412 | A1* | 2/2011 | Wiese ..................... | F24F 13/18 700/275 |

FOREIGN PATENT DOCUMENTS

| | | |
|---|---|---|
| TR | 2015/07331 | 6/2015 |
| TR | 2017/20805 | 12/2017 |

* cited by examiner

*Primary Examiner* — Jonathan Bradford
(74) *Attorney, Agent, or Firm* — Egbert Law Offices, PLLC

(57) ABSTRACT

A smart ventilation system which performs the ventilation of indoors, increases the air quality in closed spaces and maintains air quality, which is positioned over a window and includes: a ventilation module on a main body, which is attached to the window so as to control the air passage between indoors and outdoors; indoor and outdoor sensor groups which measure the air values indoors and outdoors, respectively; and an electronic card which analyzes the sensor values and engages one or more of an air intake fan group, an air outlet fan group, a dehumidifier, and a humidifier as a result of the analysis. A device provides the necessary energy from the adaptor and water reservoir.

44 Claims, 4 Drawing Sheets

SMART VENTILATION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The invention is related to a smart ventilation system which constantly provides high quality air and increases the quality of indoor air.

The invention is especially related to a smart ventilation system which constantly provides quality fresh air and increases the quality of indoor air by measuring the amount of indoor and outdoor contaminants such as $CO_2$, temperature, humidity, particulate matter (PM 2.5), CO, VOCs (Volatile Organic Compounds), LNG-LPG and Ozone.

2. Description of Related Art Including Information Disclosed Under 37 CFR 1.97 and 37 CFR 1.98

Today, according to reports by the World Health Organization, people spend 70% percent of their time at work, 20% at home and a total of 90% of their time indoors. For this reason, ventilating buildings is crucial in terms of human health. Ventilation the living areas is also necessary for maintaining hygiene in a room. In addition, ventilation alone is not sufficient in order to regulate indoor air quality. Together with ventilation, the temperature and humidity of indoor areas should be kept at ideal levels. A considerable amount of dust is likely to be present in the air brought in from outdoors, hence, the air received needs to be filtered and ventilated into the indoor areas.

In the prior art, ventilation of indoor areas is manually undertaken upon action by a user. This makes it difficult to keep the indoor air quality at consistently high levels. At the same time, excess ventilation causes energy loss. In addition, humidity and temperature cannot be brought to the desired levels by only providing ventilation.

In the prior art, devices which perform measurements of $CO_2$ level in the atmosphere, humidity and temperature are provided. These devices provide information by performing measurement of atmospheric values by means of the built-in temperature, humidity and $CO_2$ sensors and they display the values on their screen.

During research of the prior art, patent application number TR2015/07331 was encountered. The invention is related to a method for enriching air by means of a smart air conditioner and by comparing the factors which determine air quality such as the indoor and outdoor oxygen amount. Ventilation is performed by means of an air conditioner. As oxygen alone is an insufficient parameter in defining indoor air quality, it is not possible to keep indoor air quality at a comfortable level solely by means of outdoor air intake. The indoor air quality can be kept at a balanced and comfortable level only by devices which (1) decrease the number of particles in the air and (2) which increase and decrease the humidity level. In addition, an air conditioner spreads bacterium in the environment and causes respiratory tract diseases.

Application number TR2017/20805 was encountered. The application is related to regulating air quality by increasing or decreasing the speed of a fan according to values from a $CO_2$ sensor which is installed in closed spaces such as subway stations, shopping centers and houses. As $CO_2$ alone is an insufficient parameter in defining indoor air quality, it is not possible to keep the indoor air quality at a comfortable level solely by means of outdoor air intake. The indoor air quality can be kept at a balanced and comfortable level only by means of devices which decrease the number of particles in the air and which increase and decrease the humidity level. In addition, the quality of air received from outdoors is not analyzed in this invention. Today, it is possible that outdoor air taken in by the system is of poorer quality than indoor air. In this case, the device will render the indoor air quality worse instead of increasing the quality of the air.

As a result, due to the problems described above and the insufficiency of the present solutions regarding the subject, an improvement is needed in the this technical field.

THE PURPOSE OF THE INVENTION

The invention is inspired by the present situation and aims to solve the above-mentioned problems.

The main purpose of the invention is to constantly measure air quality related values by sensors placed indoors and outdoors, and to store the air quality related values measures at standards determined by international institutions such as ASHRAE (American Society Of Heating, Refrigerating And A-C Engineers), US EPA (United States Environmental Protection Agency) by means of software which has an algorithm analyzing all of the obtained sensor data, and to provide a fresh indoor air environment.

Another purpose of the invention is to create comfortable, healthy indoor environment by regulating the humidity rate in the environment (by increasing humidity when necessary and decreasing humidity when necessary) and to prevent fungus and mold formation.

Another purpose of the invention is to reduce and even eliminate the risk of respiratory diseases resulting from inhaling air which is not fresh, and which lacks quality in any kind of closed space.

Another purpose of the invention is to prevent the formation or propagation of environmental microorganisms by providing a constant quality and fresh air environment in the rooms of babies and other children.

Another purpose of the invention is to help ill and elderly people suffering from respiratory distress with ventilation by fully automatic operation of the system.

Another purpose of the invention is to prevent critical indoor air pollution which occurs at the end of the first lesson in schools. This situation causes distraction, loss of concentration and serious respiratory diseases. With this feature, the present invention can contribute to the quality of education and reduce absence rates among schoolchildren.

Another purpose of the invention is to protect people in possible gas leak (LNG-LPG) accidents by engaging a top ventilation feature and providing a warning. In addition, by constant indoors CO (carbon monoxide) measurement, the system of the present invention provides a warning and performs automatic ventilation at danger levels of CO. Thus, CO poisoning can be prevented.

BRIEF SUMMARY OF THE INVENTION

In order to accomplish the above-mentioned purposes, the invention is a smart ventilation system which performs ventilation of indoor areas, increases air quality in closed spaces and maintain high air quality. The system is positioned over the window and comprises: a ventilation module which is located on the main body, which is positioned so as to be attached to the window and to be in connection with both indoors and outdoors and which controls the air passage between indoors and outdoors. The system includes an indoors sensor group which measures the air values indoors, an outdoors sensor group which measures the air values outdoors. An electronic card analyzes the indoor and outdoor air values measured by the indoor and outdoor sensor groups. The electronic card controls the first step motor to bring clean air indoors by providing for the opening and closing of the air access cover, if there is a need for clean air as a result of the analysis. The electronic card alternately lets the polluted air out by providing the opening and closing of the air access cover by controlling the second step motor if there is a need for letting the polluted air out as a result of the analysis. An adaptor is mounted to the bottom of the window frame and provides energy which is necessary for the operation of the electronic card.

The structural and characteristic features and advantages of the invention will be understood more clearly by referring to the figures below and the detailed description below.

DESCRIPTION OF THE PART REFERENCES

Figure 1:
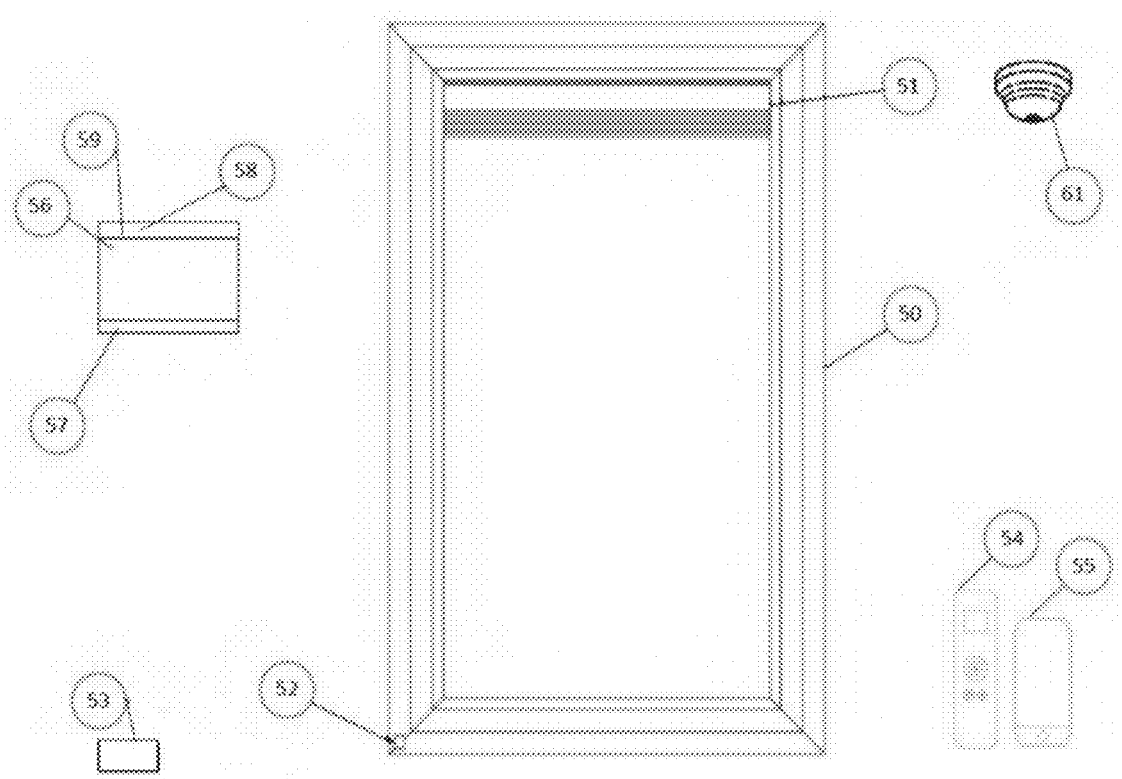
FIG. 1 is a mounted view of the smart ventilation system of the invention.
Figure 2:
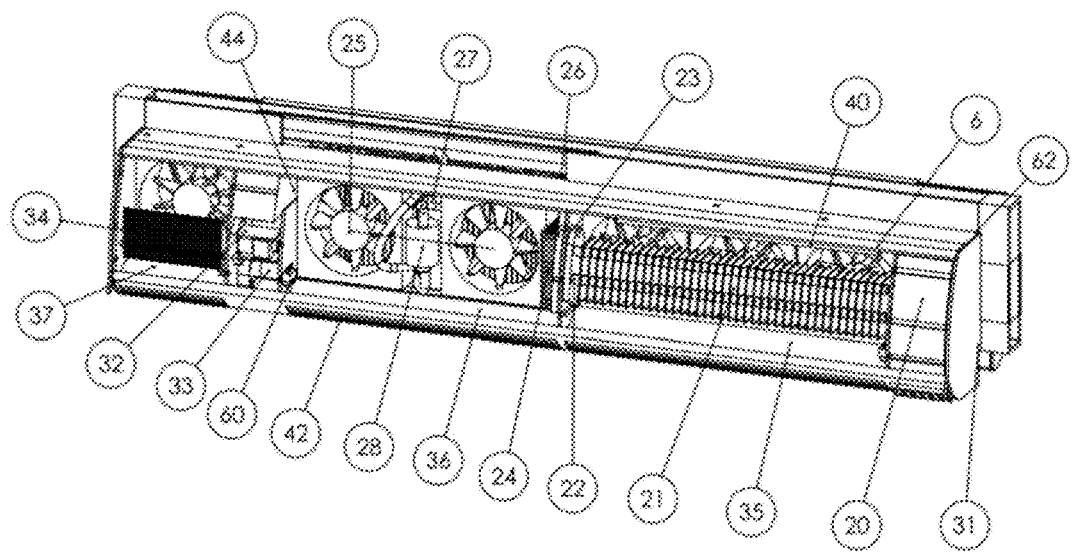
FIG. 2 is an interior view of the ventilation module which faces outdoors.
Figure 3:
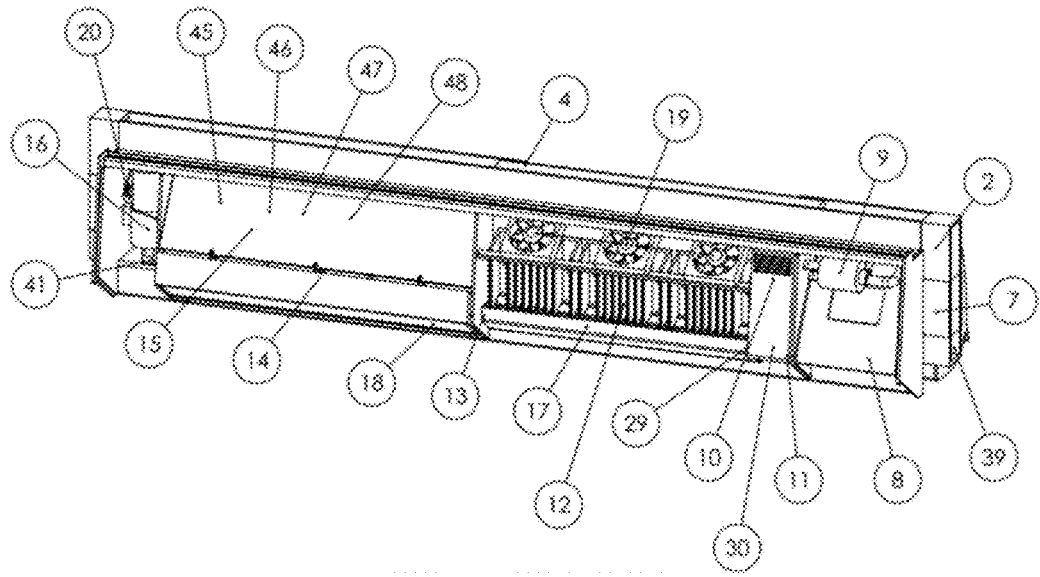
FIG. 3 is an interior view of the ventilation module which faces indoors.
Figure 4:
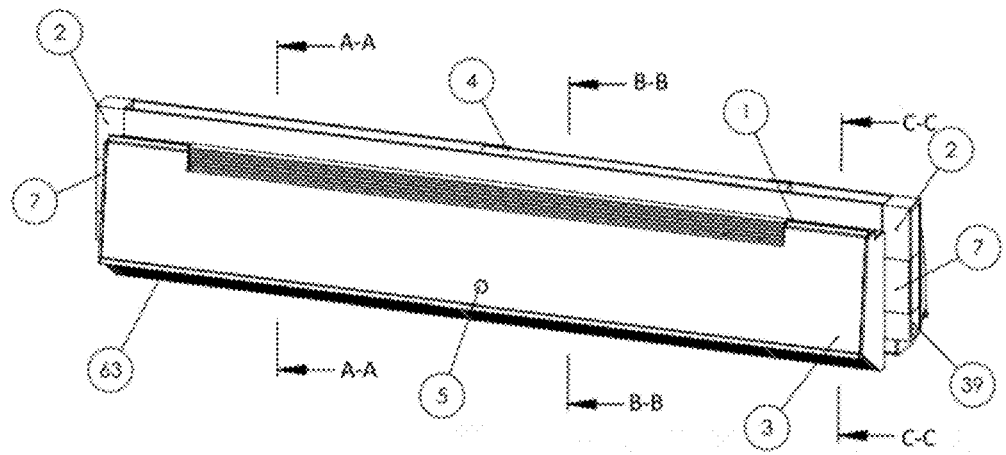
FIG. 4 is a general view of the ventilation module from within.

1. Main body
2. Side cover
3. Internal inspection cover
4. Cooler air outlet
5. Air quality status display
6. Photovoltaic panel
7. Ionizer
8. Air outlet fan group
9. First solenoid valve
10. Humidifier
11. Humidifier water level sensor
12. Dehumidifier
13. Dehumidifier water level sensor
14. Air intake fan group
15. Electronic card
16. Odor or air freshener unit
17. Water collection chamber
18. Carbon-paper filter
19. Dehumidifier air fans
20. Outdoor sensor group
21. Pre-heating-cooling unit
22. Pre-heating or cooling thermostat
23. Pre-heating or cooling Peltier
24. Pre-heating or cooling heat exchange fan
25. Dehumidifier cooling fans
26. Dehumidifier thermostat
27. Water pump
28. Second solenoid valve
29. First check valve
30. Humidifier water reservoir
31. First step motor
32. Third step motor
33. Second step motor
34. Heat exchanger
35. Air intake cover
36. Cooling section air intake cover
37. Air outlet cover
38. Expansion pins
39. Cable and water delivery connection channel
40. UV lamp
41. Ozone generator
42. Wire grid
43. Front filter
44. Second check valve
45. GSM module
46. GPS module
47. Ventilation module Wi-Fi module
48. Loudspeaker
49. Sound insulation
50. Window
51. Ventilation module
52. Energy and reserve water connection
53. Adaptor and water reservoir
54. Remote control
55. Mobile device
56. Indoor control panel
57. Indoor sensor group
58. Indoor screen Wi-Fi module
59. Communication module
60. Water overflow outlet
61. Fire smoke detector
62. Accumulator
63. Filter and odor cartridge replacement cover A-A. First cross-section
B-B. Second cross-section
C-C. Third cross-section

DETAILED DESCRIPTION OF THE INVENTION

In this detailed description, the preferred embodiments of the smart ventilation system of the invention are described only to provide better understanding of the subject.

The main body (1) of the smart ventilation system carries out indoors ventilation, increases quality of air in closed spaces and constantly maintains quality air is mounted on the glass at the top of the window (50).

Figure 5:
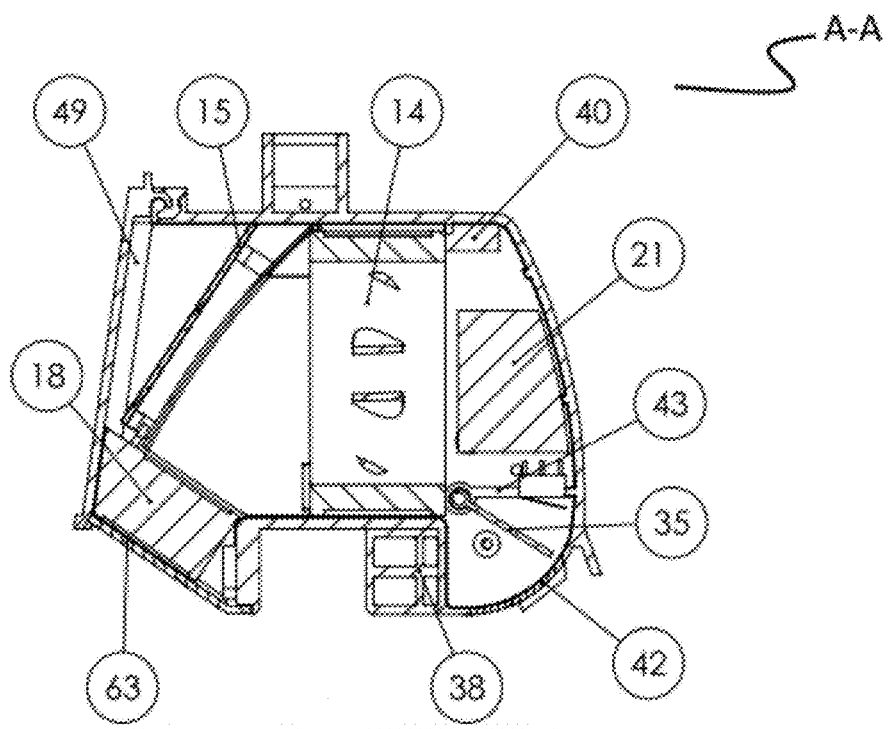
FIG. 5 is a detailed view of the first cross-section. (A-A Cross Section)

FIG. 5, which is the detailed view of the first cross section (A-A), comprises the cross-section views of the sound insulation (49), air intake fan group (14), electronic card (15), UV lamp (40), pre-heating or cooling unit (21), front filter (43), air intake cover (35), wire grid (42), expansion pins (38), filter and odor cartridge replacement cover (63) and carbon-paper filter (18).

Figure 6:
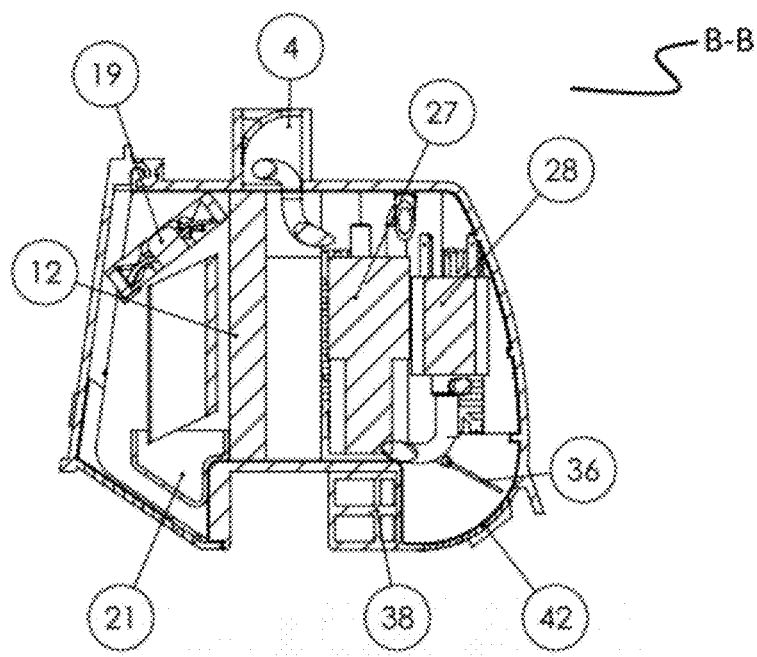
FIG. 6 is a detailed view of the second cross-section. (B-B Cross Section)
Figure 7:
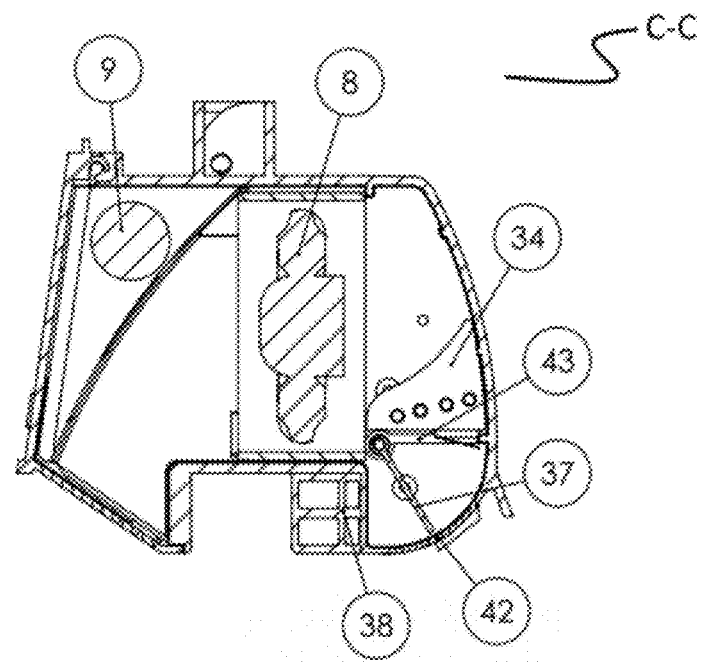
FIG. 7 is a detailed view of the third cross-section. (C-C Cross Section)

FIG. 6, which is the detailed view of the second cross section (B-B), comprises the cross-section views of the dehumidifier air fans (19), cooler air outlet (4), water pump (27), second solenoid valve (28), cooling section air intake cover (36), wire grid (42), expansion pins (38), pre-heating or cooling unit (21) and dehumidifier (12). FIG. 7, which is the detailed view of the third cross section (C-C), comprises the cross-section views of the first solenoid valve (9) air outlet fan group (8), heat exchanger (34), front filter (43), air outlet cover (37), wire grid (42) and expansion pins (38).

The ventilation module (51), which is positioned on the main body (1), is connected to both indoor and outdoor areas, controls the indoor and outdoor air passage. The air outlet cover (37) and air intake cover (35) are connected to the surface of the ventilation module (51) on the outdoors, and which can be adjusted at different angles, provide the air intake and discharge needed between indoor areas and outdoor areas with their opening and closing feature.

Indoor air values are measured by the indoor sensor group (57) and the outdoor air values (temperature, humidity, CO2, VOCs, CO, ozone, LNG-LPG and PM 2.5) are measured by the outdoor sensor group (20) mounted to the surface of the ventilation module (51) located outdoors. Users can monitor the measured values from the indoor control panel (56), their mobile devices (55) and the air quality status display (5) on the ventilation module (51).

The electronic card (15) receives the air values measured by the indoor sensor group (57) and outdoor sensor group (20) on the ventilation module (51). The electronic card analyses the changing indoor and outdoor air value trends, acceleration and the characteristic of the space. The electronic card (15) uses user demands or parameters of international norms during automatic use when an analysis process is being carried out. The user can select the internationally defined norms such as "house", "workplace", "baby room" and "school" previously uploaded to the software. In addition, according to the energy consumption demand, there are three different options of "echo", "standard" and "performance" in the software.

The electronic card (15) analyses the indoor and outdoor air values measured by the indoor sensor group (57) and outdoor sensor group (20) and controls the opening and closing of the air intake cover (35) and air outlet cover (37) on the ventilation module (51) as a result of the analysis, so as to regulate indoor air quality. The opening and closing of the fresh air intake cover (35) is carried out by the first step motor (31) which is controlled by the electronic card (15). The opening and closing of the air outlet cover (37) is carried out by the second step motor (33) which is controlled by the electronic card (15). As the air intake cover (35) and air outlet cover (37) are opened and closed at different angles according to need, the quality of indoor air is increased by receiving fresh and clean air indoors and discharging polluted air outdoors.

While the polluted air is expelled through the air outlet cover (37), the heat exchanger (34) is used with the purpose of taking advantage of the thermal energy of expelled air. The heat exchanger (34) receives the heat of the air that has been discharged via conduction while the air is being expelled. Likewise, by means of the air which is received from the outside through diffusion that passes through the heat exchanger (34), the transfer of the heat to the clean air is provided. Energy conservation is thus provided by heating or cooling the air taken from the outside.

The clean air received by the air intake cover (35) is first sterilized by the UV lamp (40) on the pre-heating or cooling unit (21). The purity rate of the clean air sterilized and sent indoors is increased by the ionizer (7) attached to the side covers (2) of the ventilation module (51). In addition, the indoor dust and particle rate is decreased and a fresher and healthier atmosphere is created by sending negative charged ion molecules to the indoor air by the ionizer (7). This helps people indoors to feel more energetic and refreshed.

While clean air is received indoors, it is important to keep out unwanted pests such as flies and other bugs. This is carried out by means of the wire grid (18) positioned on the outdoor surface of the ventilation module (51). Again, the purity rate of the air intake is increased by delivering the air through the front filter (43) in order to capture dust and particles. In addition, the carbon-paper filter (18) is positioned on the indoor surface of the ventilation module (51) and it keeps the indoor air quality stable at the highest level by filtering fresh air (dust, particles and odor). The carbon-paper filter (18) and the odor cartridge replacement cover (63) can be opened and replaced with ease. The users are notified when it is time to replace the carbon-paper filter (18) by the indoor control panel (56) and mobile device (55) application.

By means of the indoor control panel (56), the air values measured by the indoor sensor group (57) and outdoor sensor group (20) can be monitored and checked by the user. At the same time, controlling of the ventilation system can be performed with the mobile device (55) or any medium with internet access by means of the GSM module (45) on the electronic card (15). The indoor control panel (56) communicates with the electronic card (15) on the ventilation module (51) by means of Wi-Fi. The mentioned communication takes place between the indoor screen Wi-Fi module (58) and the ventilation module Wi-Fi module (47) on the ventilation module (51).

When a high rate of pollution, an uncomfortable humidity rate or an uncomfortable temperature is measured indoors with the indoor sensor group (57), the electronic card (15) informs the user through the indoor control panel (56) or the mobile device (55) to open the window if outdoor conditions are suitable. The duration of opening the window is checked by the electronic card (15). Once the indoor air is clean, this is detected by the indoor sensor group (57) and the 'close the window' alert is given to the user by means of the electronic card (7) through the indoor control panel (56). By this means, the window does not stay open longer than necessary and energy consumption is lowered. The device will bring the indoor air quality to the ideal level even if the window stays closed, however, it will consume energy, even if said consumed energy is a small amount.

In the case that the indoor air quality deteriorates due to a crowd or any polluter, the electronic card (15) engages the air intake fan group (14) and air outlet fan group (8) on the ventilation module (51). The electronic card (15) directs air to be taken indoors through the air intake fan group (14) and directs the air needed to be expelled through the air outlet fan group (8). The rotative speed of the mentioned fan groups (14,15), the number of fans engaged and the operation period are controlled by the electronic card (15).

The humidifier (10) and dehumidifier (12) on the indoor surface of the ventilation module (51) dehumidifies or humidifies the atmosphere under the control of the electronic card (15) in order to keep the humidity level measured by the indoor sensor group (57) at the ideal level. Dehumidifier air fans (19) are used for sending the indoor air which is to be dehumidified to the dehumidifier (12) and the dehumidified air to the indoors again. The water necessary for the humidification is supplied from the adaptor and water reservoir (53) as the main storage. For the user safety, the humidifier (10) humidifies the atmosphere by providing cold vapor. While in operation, the humidifier (10) takes the air it will use from the humidifier water reservoir (30) in the ventilation module (51). When the humidifier water level sensor (11) in the humidifier water reservoir (30) detects that the water level is decreased, it engages the water pump (27) controlled by the electronic card (15). Water pump (27) draws water into the humidifier water reservoir (30) section until it is brought to the determined level from the adaptor and water reservoir (53). During the mentioned water drawing process, in order to channel the water to the pipe, the 1st solenoid valve (9) is activated. In order to prevent the water flow in the reverse direction, there is a second check valve (44) at the outlet of the first solenoid valve (9).

The water generated during the operation of the dehumidifier (12) is collected in the water collection chamber (17). When the dehumidifier water level sensor (13) detects that the water collection chamber (17) is full, the electronic card (15) engages the water pump (27). The water pump (27) pumps the water collected in the water collection chamber (17) to the humidifier water reservoir (30). During the mentioned process, the second solenoid valve (28) is activated in order to correctly channelize to the water pipes. In addition, at the outlet of the second solenoid valve (28), there is a first check valve to prevent water flow in the reverse direction. During this process, if the humidifier water reservoir (30) is filled, the excess water is expelled by means of the water overflow outlet (60).

When the dehumidifier (12) starts to operate, dehumidifier cooling fans (25) engage in order to remove the heat generated. When the dehumidifier cooling fans (25) start to operate, the cooling section air intake cover (36) is opened. The opening and closing of the cooling section air intake cover (36) is carried out through the third step motor (32) controlled by the electronic card (15). The hot air generated is removed from the atmosphere by means of the cooler air outlet (4). In addition, the dehumidifier thermostat (26) is also used in order to stop the dehumidifier (12) in case of the dehumidifier (12) overheating.

The device meets demands of users who are sensitive to temperature changes, such as nursery rooms and private sick rooms. The pre-heating cooling Peltier (23) is used as the heater or cooler according to the demand. When the pre-heating cooling Peltier (23) operates, it performs the heating or cooling by means of the pre-heating cooling heat exchange fan (24) according to the need. In this section, there is a pre-heating cooling thermostat (22) which closes and deactivates the pre-heating or cooling unit (21) in case of overheating or icing.

The electronic card (15) operates on 12 V. The mains electricity which has a 220 V (or 110 V) value is lowered to the 12 V necessary for the operation of the electronic card (15) by means of the adaptor and water reservoir (53), and it prevents 220 V from being present on the window (18) and thus, the user safety is increased. The 12 V energy from the adaptor is transferred to the device by being connected to the inlet of the energy and water reservoir (52) mounted at the bottom of the window (50) frame by a plug.

In the case that risk levels of a hazardous (e.g. poisonous, flammable, smothering) gas is detected by the indoor sensor group (57), an audible warning is given from the loudspeaker (48) on the ventilation module (51). In addition, if the user is on vacation or at a remote location, an automatic mail or SMS alert is given to the user mobile device (55) by the GSM module (45) on the electronic card (15). In this case, the ventilation system should run the intake fan group (14) and air outlet fan group (8) at the highest turnover according to the electronic card (15) routing in order to lower the level of hazardous gas.

Since the electronic card (15) is in connection with the fire-smoke detector (61) indoors, when the fire-smoke detector is triggered, it runs the air intake fan group (14) and air outlet fan group (8) at the highest rotative speed. In this case, the users are alerted by means of SMS and mail.

An odor or air freshener unit (37) controlled by the electronic card (15) can be added to the ventilation module (51) on demand. In this way, bad odors indoors are prevented and a nice-smelling atmosphere is provided. Odor unit cartridges can be easily replaced by opening the filter and odor cartridge replacement cover (63).

The ventilation module (51) has an internal inspection cover (3) for intervention without detaching it completely in case of maintenance and service needs following long term usage. In addition, a cable and water delivery channel (39) is designed in order to render the cabling water transfer procedures more secure in the ventilation module (51). In order to prevent noise generated during operation of the ventilation module (51), it has sound insulation (49) at the indoors side.

The ozone generator (41) is on the ventilation module (51) and sterilizes the atmosphere under the control of the electronic card (15) according to the data it receives from the indoor sensor group (57).

In order to fulfill the need for mounting the ventilation module (51) on a three-layer glass unit, the use of which has increased in the recent years, expansion pins (38) are present on the ventilation module (51) for the triple glass. The expansion pins (38) enable mounting of the ventilation module (51) on the window (50) by being disassembled and assembled.

The device basic functions can be managed by a remote control (54).

Photovoltaic energy support can be provided by adding the photovoltaic panel (6) on the surface of the ventilation module (29) outdoors. In this way, the energy necessary for the operation of the device is provided by the photovoltaic panel (6) when the solar energy is sufficient. The unused energy can be stored by means of the accumulator (62). The accumulator (62) can be mounted on the body of the ventilation module (51), which remains outside of the core module in which all the apparatuses are present.

The remote communication module (59) which communicates with the heater and air conditioner can be optionally added on the ventilation module (29). In this way, the temperature of the indoors can be adjusted in the case that the weather is too hot or cold. This improves energy conservation and comfort.

On the ventilation module (51), there is a GSM module (45) which sends the outdoor air values obtained by the outdoor sensor group (20) to the cloud (auxiliary server) in order to create detailed air quality maps. The electronic card (15) sends necessary location information to the cloud in order to create a map by means of the GPS module (46). This data could be used as a beneficial database for the researchers, the Ministry of Environment and the Ministry of Health. In addition, users will have information on the polluted and clean areas in the cities where they live. This information can be used to alert and guide people for outdoor activities.

I claim:

1. A smart ventilation system which carries out ventilation of indoor areas and provides an air quality that meets the requirements of a user, that is positioned over a window of a closed space, the system comprising:
    a ventilation module which is located on a main body of the smart ventilation system, connected to the window and positioned to be in communication with an indoor space and an outdoor space, and which controls air passage between the indoor space and the outdoor space;
    an indoor sensor group which measures air values indoors,
    an outdoor sensor group which measures air values outdoors,
    an electronic card (15), which
        analyzes the air values which it receives from the indoor sensor group and facilitates introduction of outdoor air to the closed space by controlling a first stepper motor and opening and closing an air intake cover if there is a need for outdoor air as a result of the analysis that has been carried out,
    analyzes the air values which it receives from the outdoor sensor group and facilitates discharge of indoor air outwardly from the closed space by controlling a second stepper motor and by opening and closing an air outlet cover if there is a need for discharging indoor air out as a result of the analysis that has been carried out,
    an adaptor and water reservoir mounted to a bottom of a frame of the window, the adaptor providing energy required for the operation of the electronic card.

2. The smart ventilation system according to claim 1, further comprising a heat exchanger positioned on the ventilation module.

3. The smart ventilation system according to claim 1, further comprising an indoor control panel.

4. The smart ventilation system according to claim 3, further comprising an indoor screen Wi-Fi module which enables communication between the indoor control panel and the electronic card (15).

5. The smart ventilation system according to claim 4, further comprising a ventilation module Wi-Fi module, which is located on the ventilation module and which communicates with the indoor screen Wi-Fi module.

6. The smart ventilation system according to claim 1, further comprising a carbon-paper filter which is positioned on a surface of the ventilation module indoors.

7. The smart ventilation system according to claim 1, further comprising a dehumidifier controlled by the electronic card which maintains an indoor humidity value measured by the indoor sensor group at an ideal value.

8. The smart ventilation system according to claim 7, further comprising dehumidifier air fans which deliver the indoor air which will be dehumidified to the dehumidifier and which deliver dehumidified air back indoors.

9. The smart ventilation system according to claim 1, further comprising a humidifier which is located at the indoor surface of the ventilation module and which is controlled by the electronic card so as to maintain an indoor humidity value measured by the indoor sensor group at an ideal value.

10. The smart ventilation system according to claim 9, wherein the water reservoir stores water necessary for humidification.

11. The smart ventilation system according to claim 9, further comprising a humidifier water reservoir located inside the ventilation module.

12. The smart ventilation system according to claim 11, further comprising a humidifier water level sensor for detecting a level of the water in the humidifier water reservoir, wherein a water pump is engaged by the electronic card as a result of the detection of the the level of water in the humidifier water reservoir.

13. The smart ventilation system according to claim 12, further comprising a first solenoid valve which is activated in order for the water pump to draw water from the adaptor and water reservoir into the humidifier water reservoir.

14. The smart ventilation system according to claim 13, further comprising a check valve at the outlet of the first solenoid valve.

15. The smart ventilation system according to claim 7, further comprising a water collection chamber which stores water that is generated during operation of the dehumidifier.

16. The smart ventilation system according to claim 15, further comprising a dehumidifier water level sensor for detecting a water level in the water collection chamber.

17. The smart ventilation system according to claim 16, further comprising a solenoid valve which is activated for pumping water collected in the water collection chamber to a humidifier water reservoir by a water pump.

18. The smart ventilation system according to claim 17, further comprising a check valve at the outlet of the solenoid valve.

19. The smart ventilation system according to claim 17, further comprising a water overflow outlet which enables excess water to be discharged when the humidifier water reservoir is full.

20. The smart ventilation system according to claim 7, further comprising dehumidifier cooling fans which remove heat generated when the dehumidifier starts operating.

21. The smart ventilation system according to claim 20, further comprising a cooling section air intake cover of the ventilation module which may be opened by a third stepper motor controlled by the electronic card when the dehumidifier cooling fans begin to operate.

22. The smart ventilation system according to claim 7, further comprising a dehumidifier thermostat which stops the dehumidifier (12) when the dehumidifier is overheated.

23. The smart ventilation system according to claim 1, further comprising a UV lamp for sterilizing air (40) which sterilizes the air received by the air intake cover, the UV lamp located on a pre-heating or cooling unit, the pre-heating or cooling unit comprising a Peltier element for selectively heating or cooling air.

24. The smart ventilation system according to claim 1, further comprising an ionizer attached to a side cover of the ventilation module.

25. The smart ventilation system according to claim 1, further comprising a wire grid which is positioned on an outdoor surface of the ventilation module.

26. The smart ventilation system according to claim 1, further comprising an air filter on the ventilation module.

27. The smart ventilation system according to claim 1, further comprising a Peltier element for heating or cooling, wherein a heat exchange fan provides a flow of air to the Peltier element.

28. The smart ventilation system according to claim 23, further comprising a thermostat for deactivating the pre-heating or cooling unit.

29. The smart ventilation system according to claim 1, further comprising an air quality status display for monitoring the air values measured by the indoor sensor group and outdoor sensor group, the air quality status display being located on the ventilation module.

30. The smart ventilation system according to claim 1, further comprising a loudspeaker which gives an audible warning if a hazardous gas level detected by the indoor sensor group reaches a risk level.

31. The smart ventilation system according to claim 1, further comprising a global system for mobile communication module which submits an automatic mail or SMS alert to a mobile device or cell phone of a user in the case that a hazardous gas level is detected by the indoor sensor group reaches a risk level.

32. The smart ventilation system according to claim 1, further comprising an air intake fan group which draws outdoor air indoors by operating at a high speed if a hazardous gas level detected by the indoor sensor group reaches a risk level.

33. The smart ventilation system according to claim 1, further comprising an air outlet fan group which discharges indoor air to the outdoors by operating at a high speed if a hazardous gas level detected by the indoor sensor group reaches a risk level.

34. The smart ventilation system according to claim 1, further comprising an air freshener unit, having an air freshener cartridge therein, the air freshener unit being positioned on the ventilation module.

35. The smart ventilation system according to claim 6, further comprising a filter replacement cover which enables replacement of the carbon paper filter.

36. The smart ventilation system according to claim 1, further comprising a photovoltaic panel mounted on an outdoor portion of the ventilation module.

37. The smart ventilation system according to claim 1, further comprising a communication module positioned on the ventilation module which allows for adjustment of indoor temperature by communicating with an HVAC system of the closed space.

38. The smart ventilation system according to claim 1, further comprising a global positioning system module that submits the air values measured by the outdoor sensor group to a storage cloud together with location information generated by the global positioning system module for creating air quality maps.

39. The smart ventilation system according to claim 1, further comprising an internal inspection cover for maintenance and service of the ventilation module.

40. The smart ventilation system according to claim 1, further comprising an ozone generator located on the ventilation module.

41. The smart ventilation system according to claim 1, further comprising a cable and water delivery channel.

42. The smart ventilation system according to claim 1, further comprising expansion pins which are located on the ventilation module and which enable mounting of the ventilation module to double or triple paned windows.

43. The smart ventilation system according to claim 1, further comprising sound insulation which is located at an indoor surface of the ventilation module.

44. The smart ventilation system according to claim 36, further comprising an accumulator which stores energy generated by the photovoltaic panel (6).

* * * * *